United States Patent
Bader-Natal et al.

(10) Patent No.: US 10,356,364 B2
(45) Date of Patent: Jul. 16, 2019

(54) REGISTERING AND DISPLAYING VISUAL ATTENTION METADATA IN A WEB VIDEO CONFERENCING AND SEMINAR SYSTEM

(71) Applicant: Minerva Project, Inc., San Francisco, CA (US)

(72) Inventors: Ari Bader-Natal, Pacifica, CA (US); Stephen Michael Kosslyn, San Francisco, CA (US); Jonathan Scott Katzman, San Francisco, CA (US); Matthew Michael Regan, Seattle, WA (US)

(73) Assignee: Minerva Project, Inc., San Francisco, CA (US)

( * ) Notice: Subject to any disclaimer, the term of this patent is extended or adjusted under 35 U.S.C. 154(b) by 298 days.

(21) Appl. No.: 14/481,854

(22) Filed: Sep. 9, 2014

(65) Prior Publication Data

US 2015/0074556 A1    Mar. 12, 2015

Related U.S. Application Data

(60) Provisional application No. 61/876,051, filed on Sep. 10, 2013.

(51) Int. Cl.
| | | |
|---|---|---|
| *H04N 7/15* | (2006.01) | |
| *G06F 3/01* | (2006.01) | |
| *H04L 12/18* | (2006.01) | |
| *H04L 12/58* | (2006.01) | |
| *H04L 29/06* | (2006.01) | |

(52) U.S. Cl.
CPC .............. *H04N 7/152* (2013.01); *G06F 3/013* (2013.01); *H04L 12/1813* (2013.01); *H04L 51/04* (2013.01); *H04L 65/403* (2013.01)

(58) Field of Classification Search
CPC ... H04L 65/403; H04L 12/1813; H04L 51/04; G06F 3/013; H04N 7/152
See application file for complete search history.

(56) References Cited

U.S. PATENT DOCUMENTS

| 7,007,235 B1 | 2/2006 | Hussein et al. |
| 8,928,727 B1 | 1/2015 | Milligan et al. |
| 2004/0044556 A1* | 3/2004 | Brady .............. G06Q 10/06311 705/7.13 |
| 2004/0107251 A1* | 6/2004 | Wat ..................... H04L 12/1813 709/204 |
| 2004/0161728 A1* | 8/2004 | Benevento, II ........ G06Q 10/10 434/118 |

(Continued)

OTHER PUBLICATIONS

Abandonment from U.S. Appl. No. 14/675,712 dated Jun. 16, 2016, 1 page.

(Continued)

*Primary Examiner* — Ting Z Lee
(74) *Attorney, Agent, or Firm* — Nicholson De Vos Webster & Elliott LLP

(57) ABSTRACT

A method is disclosed for portraying physical visual attention cues or visual cues normally present in a conventional physical world in a virtual conference or class. The visual cues can be emulated by electronic signals in a video environment through physical interactions with the computer input by the user or participant of the virtual conference or image recognition algorithms provided by the video conferencing system.

15 Claims, 6 Drawing Sheets

(56) References Cited

U.S. PATENT DOCUMENTS

| | | |
|---|---|---|
| 2005/0032539 A1 | 2/2005 | Noel et al. |
| 2007/0188597 A1* | 8/2007 | Kenoyer ............... H04N 7/147 348/14.08 |
| 2007/0263821 A1 | 11/2007 | Shaffer et al. |
| 2007/0263824 A1 | 11/2007 | Bangalore et al. |
| 2011/0196928 A1 | 8/2011 | Pryhuber |
| 2011/0316965 A1 | 12/2011 | Moore et al. |
| 2012/0066697 A1 | 3/2012 | Dempski et al. |
| 2012/0182384 A1* | 7/2012 | Anderson ........... H04L 12/1827 348/14.09 |
| 2012/0204118 A1* | 8/2012 | Lefar ..................... G06Q 10/10 715/756 |
| 2012/0229446 A1* | 9/2012 | Hyndman ............... G09B 5/06 345/419 |
| 2012/0246295 A1 | 9/2012 | Gonzalez-Banos et al. |
| 2013/0018960 A1 | 1/2013 | Knysz et al. |
| 2013/0076853 A1* | 3/2013 | Diao ..................... H04N 7/157 348/14.08 |
| 2013/0176250 A1* | 7/2013 | Lee ......................... G06F 3/013 345/173 |
| 2014/0028784 A1 | 1/2014 | Deyerle et al. |
| 2014/0047027 A1 | 2/2014 | Moyers et al. |
| 2014/0085404 A1 | 3/2014 | Kleinsteiber et al. |
| 2014/0104366 A1 | 4/2014 | Calman et al. |
| 2014/0104392 A1* | 4/2014 | Thorn ..................... G06F 3/013 348/46 |
| 2014/0168056 A1* | 6/2014 | Swaminathan .... G06K 9/00604 345/156 |
| 2014/0267550 A1 | 9/2014 | Nimri et al. |
| 2014/0307042 A1 | 10/2014 | Heatley et al. |
| 2014/0362165 A1 | 12/2014 | Ackerman et al. |
| 2015/0019624 A1 | 1/2015 | Jayakeerthy et al. |
| 2015/0180748 A1 | 6/2015 | Ding et al. |
| 2015/0201161 A1 | 7/2015 | Lachapelle et al. |
| 2015/0304369 A1 | 10/2015 | Sandholm et al. |

OTHER PUBLICATIONS

International Preliminary Report on Patentability for Application No. PCT/US15/26885 dated Oct. 25, 2016, 7 pages.
International Search Report and Written Opinion for Application No. PCT/US15/26885 dated Sep. 16, 2015, 16 pages.
Non-Final Office Action from U.S. Appl. No. 14/675,708 dated Nov. 18, 2015, 5 pages.
Non-Final Office Action from U.S. Appl. No. 14/675,712 dated Nov. 19, 2015, 6 pages.
Notice of Allowance from U.S. Appl. No. 14/675,708 dated Jul. 29, 2016, 8 pages.
Notice of Allowance from U.S. Appl. No. 14/675,708 dated Nov. 14, 2016, 6 pages.
Notice of Allowance from U.S. Appl. No. 14/675,712 dated Mar. 10, 2016, 12 pages.
Notice of Allowance from U.S. Appl. No. 14/675,708, dated Mar. 16, 2016, 12 pages.
Extended European Search Report for Application No. 15783535.6, dated Nov. 22, 2017, 8 pages.
Final Office Action from U.S. Appl. No. 15/376,506, dated Sep. 20, 2017, 7 pages.
Non-Final Office Action from U.S. Appl. No. 15/376,506, dated May 31, 2017, 10 pages.
Notice of Allowance from U.S. Appl. No. 15/376,506, dated Jan. 22, 2018, 7 pages.
Notice of Allowance from U.S. Appl. No. 14/675,712, dated Mar. 2, 2018, 11 pages.
Non-Final Office Action from U.S. Appl. No. 15/943,313, dated Sep. 26, 2018, 16 pages.
Final Office Action from U.S. Appl. No. 15/943,313, dated Mar. 11, 2019, 19 pages.

* cited by examiner

REGISTERING AND DISPLAYING VISUAL ATTENTION METADATA IN A WEB VIDEO CONFERENCING AND SEMINAR SYSTEM

CROSS-REFERENCE TO RELATED APPLICATIONS

This application claims the benefit of U.S. Provisional Application No. 61/876,051, filed on Sep. 10, 2013, which is hereby incorporated by reference in its entirety.

BACKGROUND

1. Field of Art

The disclosure generally relates to the field of virtual conferences and virtual teaching, more specifically to virtual or visual cues in virtual conferences and virtual classes.

2. Description of the Related Art

Virtual conference and teaching systems, such as teleconferences, televised sermons, web seminars, and debates, have one or more participants, e.g., students, communicating with other participants verbally or, in some situations, only a leader, e.g., a teacher, of the one or more participants communicating to other participants. However, communicating in a computer-mediated virtual space does not allow participants to recognize some physical signals or body language, such as maintaining eye contact or looking at someone, otherwise seen in co-present physical spaces. Rather, those physical signals are lost and there is no conventional mechanism to translate them to the virtual space.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
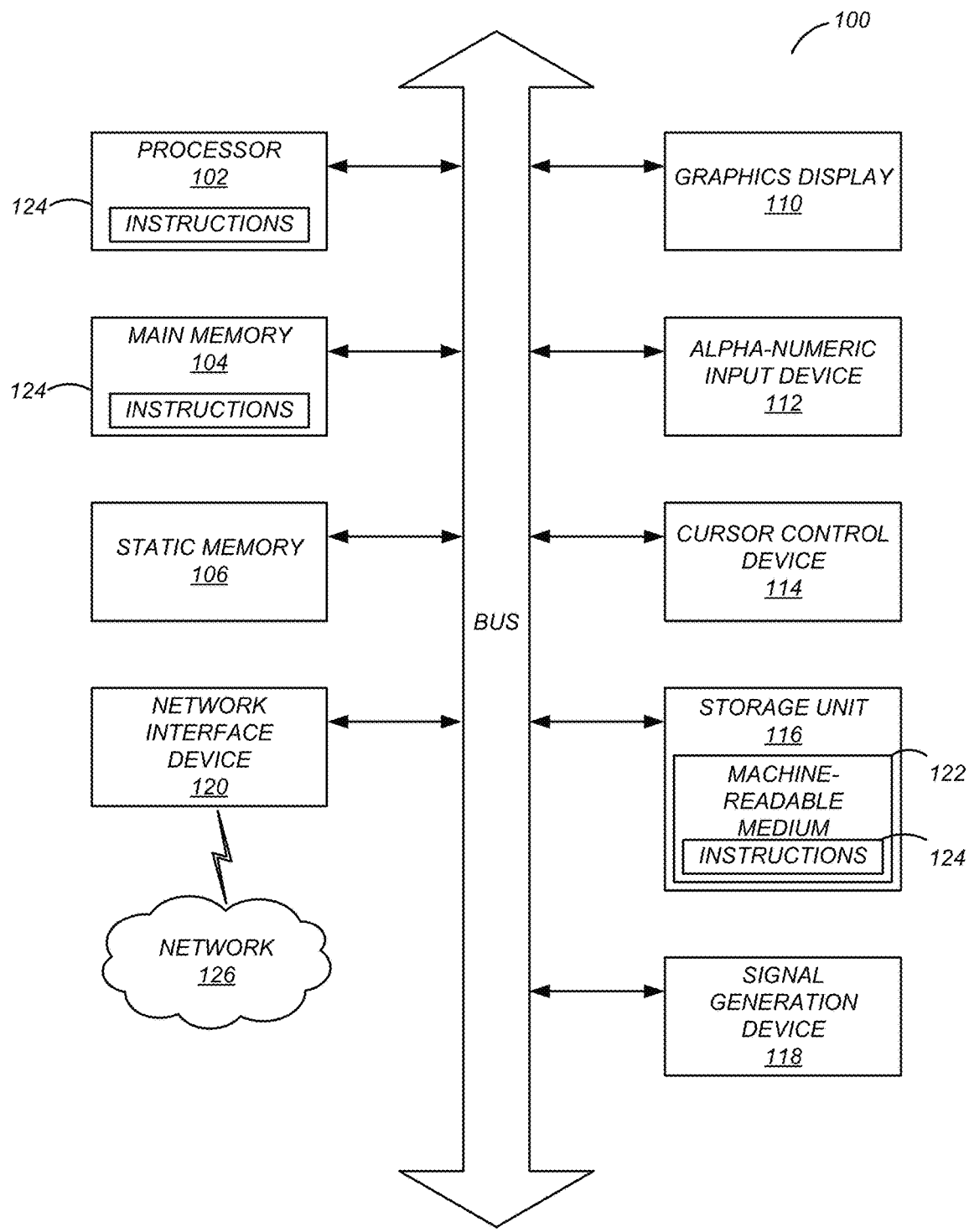
FIG. 1 illustrates one embodiment of components of an example machine able to read instructions from a machine-readable medium and execute them in a processor (or controller).

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium includes a virtual conference or class with one or more participants, e.g., students, communicating with each other via client devices through one or more interfaces. The participants input actions on their respective interfaces of their respective client devices and those actions are translated into one or more visual cues visible to the other participants via interfaces on their client devices.

Physical visual interactions conventionally lost in a video conferencing environment are now emulated to the participants of the conference or course. In one example embodiment an action is received from a client device associated with a participant for a second client device associated with a recipient participant in the virtual conference or class, wherein the participant can be an attendee, e.g., a student, and a leader, e.g., a teacher. The action can be a click of the cursor, a mouseover, a touch of the interface of a client device, and eye contact with the interface of a client device associated with a portion associated with a digital representation of the participant. The digital representation can be a video feed, an image, a sequence of images, an icon, text, or any combination thereof. The action is translated into an updated visual cue based on a dictionary of associations between actions and visual cues. The visual cues include altered borders, filters for the digital representations, icons or text overlays, and other visually noticeable alterations to the digital representation of the participant who took or is a recipient of the action. Then, the updated visual cue is provided for display in one or more interfaces of client devices to update the visual cue and, thus, digital representation of the participants. For example, if each participant in the conference or class sees a digital representation (e.g., a still image or video) of each of the participants via their client devices, when a first participant clicks on the icon of a second participant, the second participant receives a cue on the icon of the first participant—which can indicate that the first participant is "looking at" the second participant, or any other suitable visual cue based on the dictionary of associations.

Computing Machine Architecture

The configurations disclosed herein operate within a computing environment comprised of one or more machines. FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software or computer program) for causing the machine to perform any one or more of the processor (or methodologies) discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine, e.g., computer system 100, may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes one or more processors (generally, a processor) 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 120, which also are configured to communicate via the bus 108. The computer system 100 display unit may be a touch sensitive screen that accepts user input via touch in addition to displaying user interfaces.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Presenting Visual Attention Meta-Data in a Virtual Conference or Classroom

Figure 2:
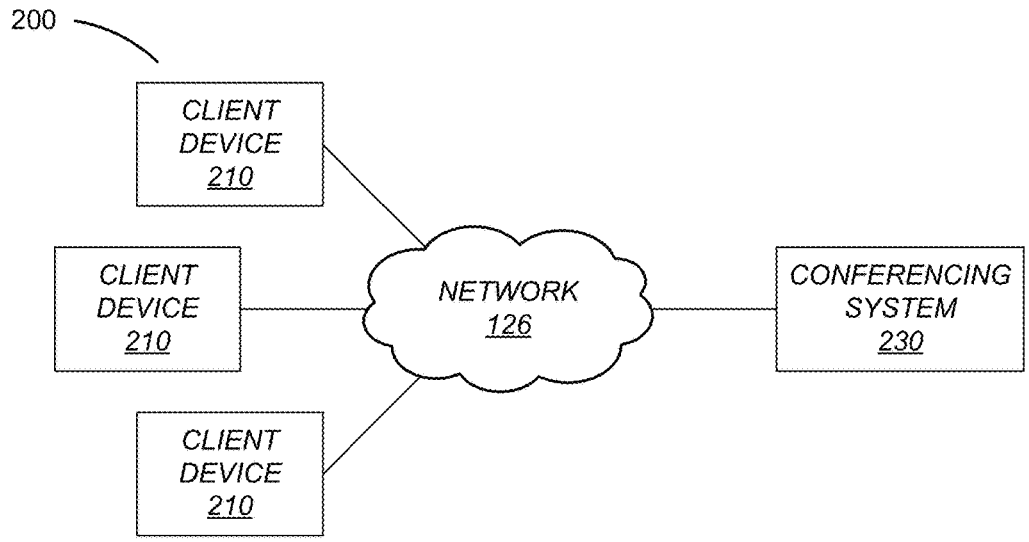
FIG. 2 illustrates one embodiment of a virtual conference environment where one or more participants communicating over a network via client devices are moderated by a conferencing system.

Referring now to FIG. 2, illustrated is an example of one embodiment of a virtual conference environment 200 where one or more participants communicating over a network 126 via client devices 210 are moderated by a conferencing system 230. Virtual conference environments 200 may be online conferences, online classrooms, online seminars, online meetings, online lectures, online discussions, other suitable online teaching or learning environments, or any other suitable online gathering. Participants in the environment 200 include one or more attendees and one or more leaders. Participants participate in the virtual conference environment 200 via client devices 210 that are computing systems, e.g., computer system 100.

Attendees include one or more students, one or more guests, one or more invitees, one or more debaters, any other suitable audience of the virtual conference or class, and any combination thereof. The leader includes a professor, a teacher, a speaker, a moderator, and any other suitable leading figure of the virtual conference. The conferencing system 230 moderates the virtual conference environment 200 among the participants using client devices 210 by converting visual attention or actions into visual cues visible to a viewing participant in the virtual conference. For example, in a discussion setting, the conferencing system 230 can detect a first participant via a client device 210 physically looking at a second participant by detecting an input associated with the second participant's digital representation (e.g., a click on the second participant's digital representation). The conferencing system 230 updates a visual cue of the digital representations on interfaces of client devices 210 in the virtual conference to portray the interaction between the first and second participants. In various embodiments, each of the participants are presented as digital representations such as a video feed, an image, a sequence of images, an icon, a thumbnail, text, or any combination thereof.

For example, the conferencing system 230 describes various relationships between participants. For example, the conferencing system 230 can represent a leader in the participants "focusing" on another attendee in the participants with a visual cue such as a bright red border around the top and left side of a digital representation (e.g., a thumbnail video) of the another attendee. The conferencing system 230 can represent how many participants are "staring" at a participant with another visual cue such as a border on the right and bottom of a digital representation of the participant that changes in intensity as more participants focus on the participant. For the participant, a different visual cue may be represented by the conferencing system 230 such as a visual cue of a symbol indicative of another participant associated with a digital representation including the symbol "staring" at the participant. In other embodiments, different and/or additional visual cues may be used by the conferencing system 230 as further described below in conjunction with FIG. 3.

Figure 3:
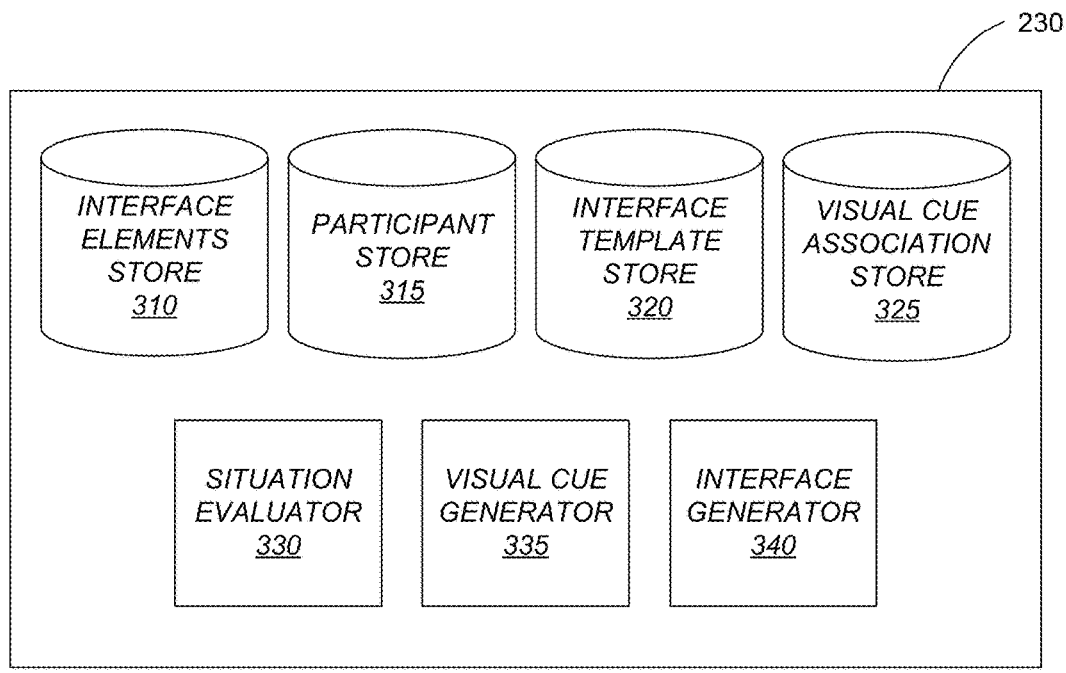
FIG. 3 illustrates one embodiment of moderation of communication among the participants via client devices by the conferencing system in the virtual conference environment.

Referring now to FIG. 3, illustrated is an embodiment of the conferencing system 230 used for moderating communication between participants using client devices 210 in the virtual conference environment 200. The conferencing system 230 includes an interface elements store 310, a participant store 315, an interface template store 320, a visual cue association store 325, a situation evaluator 330, a visual cue generator 335, and an interface generator 340. The situation evaluator 330 provides one or more elements for display on a user interface (or interface) and the interface generator 340 provides for display a generated interface for each participant in the virtual conference. The visual cue generator 335 generates and updates the visual cue for a first participant receiving an action from a second participant.

The interface elements store 310 stores one or more elements for display on one or more interfaces displayed on a screen of a client device 210. Interface elements include a participant element, a material element, a discussion element, a notepad element, and one or more participation options. On a client device 210 of a particular participant, the participant element displays other participants in the virtual conference via digital representations of the other participants with visual cues associated with the other participants. In one embodiment, where the leader is the particular participant, the leader can observe the participant profile adjacent to a digital representation of the participant. In another embodiment, the attendees can also see select information from the participant profile of various participants. For example, the attendees may be allowed to view the name and major of their fellow attendees but not the grades and participation history.

The material element displays main and supplemental content. The main and supplemental content includes, for example, presentations (e.g., Powerpoint), documents, web links, readings, handouts for homework or class work, agendas, a syllabus, and any other suitable digital files for the conference. The material element can be displayed to all participants of the conference and, in one embodiment, the files for display in the material element can only be uploaded by the leader. In another embodiment, the leader can allow, through a system configuration selectable by the leader, attendees to upload files or review files uploaded by attendees before presenting the files in the material element.

The discussion element allows participants to converse with each other in a discussion thread and includes a comment section, a display section, an attachment option, and other suitable sections to allow participants to partake in the discussion. In one embodiment, the participants have private messaging systems for messaging fellow participants. For example, a first participant can click on a digital representation of a second participant or the name of the second participant on the discussion thread to activate a pop-up message box between the first participant and second participant. The leader may have access to view when the pop-up message boxes are prompted but may not have access to view the content in the pop-up message boxes.

The notepad element allows participants to take notes during the virtual conference and includes a comment section, an attachment option and other suitable sections or options to allow participants to take notes. The participation options are elements representing options for conference actions and include entering the virtual conference, exiting the virtual conference, inviting another participant to the virtual conference, notification of raising a hand, notification of stepping out of the virtual conference, muting a microphone, recording the virtual conference, uploading and/or downloading sound files, uploading and/or downloading picture files, uploading and/or downloading annotated documents, and other suitable options for participating in the virtual conference.

Other interface elements only available for the leader include a participant statistics element, a visual cue filter element, a message viewer element, and a topic selection element. The participant statistics element displays additional information about the participants of the virtual conference. Additional information includes, for example, names, grades, major, graduation year, and participation history. The visual cue filter element displays when actions are being performed by the attendees. In one embodiment, the leader can cancel actions performed. For example, if an attendee is deliberately performing an action for one attendee in the virtual conference in a disruptive manner, the leader can cancel the action or block the attendee from performing the action for an interval of time. The message viewer element displays when messages are being sent from a participant to another participant. For example, the leader can see when attendees are having difficulty learning the material or are losing interest in the material by checking frequency of messages being sent between attendees via client devices 210. The topic selection element allows the leader to determine the topic of the conference.

The participant store 315 stores one or more user profiles of participants. User profiles may include names, grades, participation history, major, graduation year, participation history, and other suitable statistics associated with the participants relevant to the virtual conference. In one embodiment, in a school environment, the participant store 315 can also group user profiles by association such as a roster indicating which participants associated with the user profiles are in the same classes.

The interface template store 320 stores one or more templates to construct the one or more interfaces for each participant. The templates include one or more elements and instructions for positioning elements relative to each other on the interface. For example, a first template may include the participant element, the material element, the discussion element, the notepad element, and the participation options where the material element is a dominant element and occupies half of the interface. In another example, a second template includes the elements of the first template but the dominant elements are the participant element and discussion element, occupying two-thirds of the interface. In yet another example, a third template includes the elements of the first template except for the notepad element. In various embodiments, the elements are resizable and can be moved around in the interface, allowing each participant to personalize their interface on their respective client devices 210.

The one or more templates stored in the interface template store 320 can be associated with one or more topics. In one embodiment, the leader provides a topic of the virtual conference. Depending on the topic, different interface elements are included in the interface and, therefore, different interface templates are used to construct the interface. A topic describes relationships between participants. For example, the topic describes whether the participants include a leader, a plurality of leaders, or no leader. Topic formats may include, for example, a lecture, a discussion, a debate, or a student presentation. The topics can be a school subject, for example, history, government, English, language, math, physics, biology, chemistry, and other suitable subjects to be taught in school.

The visual cue association store 325 stores one or more associations of one or more actions performed by a participant to one or more visual cues and one or more visual cues. The one or more actions performed by the participant include using a pointing device, touch sensitive gesture, or eye interaction (e.g., using an iris detection subsystem) for clicking, a mouseover (e.g., hover a pointing device cursor over a visual element in a user interface), making eye contact, physically interacting with, and other suitable actions. In one embodiment, the actions performed are dependent on a location where the action was taken on the user interface. For one example, hovering a mouse cursor on a digital representation of a first participant will cause an altered visual cue for the first participant, such as an altered color of the digital representation of the participant who input the action.

The one or more visual cues are additional features of the digital representations of the participants. For example, the one or more visual cues include a no-action visual cue. The no-action visual cue is a default or generic visual cue for a digital representation of a participant not associated with an action. For example, the no-action visual cue is a black border around the digital representation with no image filter. Other visual cues include other alterations of visual characteristics relative to what is displayed within the user interface. Examples of altered visual characteristics include altered borders in color, brightness, opacity, saturation, contrast, intensity, hue, shadows, or width. In addition, the border may be animated in response to an action. Other visual cues include image filters for specific colors, image filters for brightness, opacity, saturation, contrast, intensity, or hue, threshold image filters, altered sizes of the digital representations, and any combination thereof. For example, an altered border has the top and left borders of a digital representation in a particular visual characteristic such as a bright red border. In another example, an altered border has the bottom and right borders of a digital representation adjust in intensity based on how many actions are directed at the participant of the digital representation. Additional visual cues include, for example, icons, buttons, and text displayed on the digital representation. For example, if a participant is directing an action for looking at a second participant (e.g., clicking on the second participant's digital representation via a client device 210, consequently enlarging the digital representation), the second participant will see an eye icon or any other suitable indicator in a corner of the digital representation of the participant, indicating that the participant is looking at the second participant.

The situation evaluator 330 can receive a topic provided by a participant of a virtual conference and determine elements for interface templates to display on interfaces of client devices 210 of participants attending the virtual conference based on or using the selected topic. The visual cue generator 335 associates participants with user profiles of the participants and generates visual cues based on inputs received from the participants. The interface generator 340 generates user interfaces for display on client devices 210 associated with participants using determined elements and interface templates determined by the situation evaluator 330. The situation evaluator 330, visual cue generator 335, and interface generator 340 are further described in conjunction with FIG. 4 below.

Figure 4:
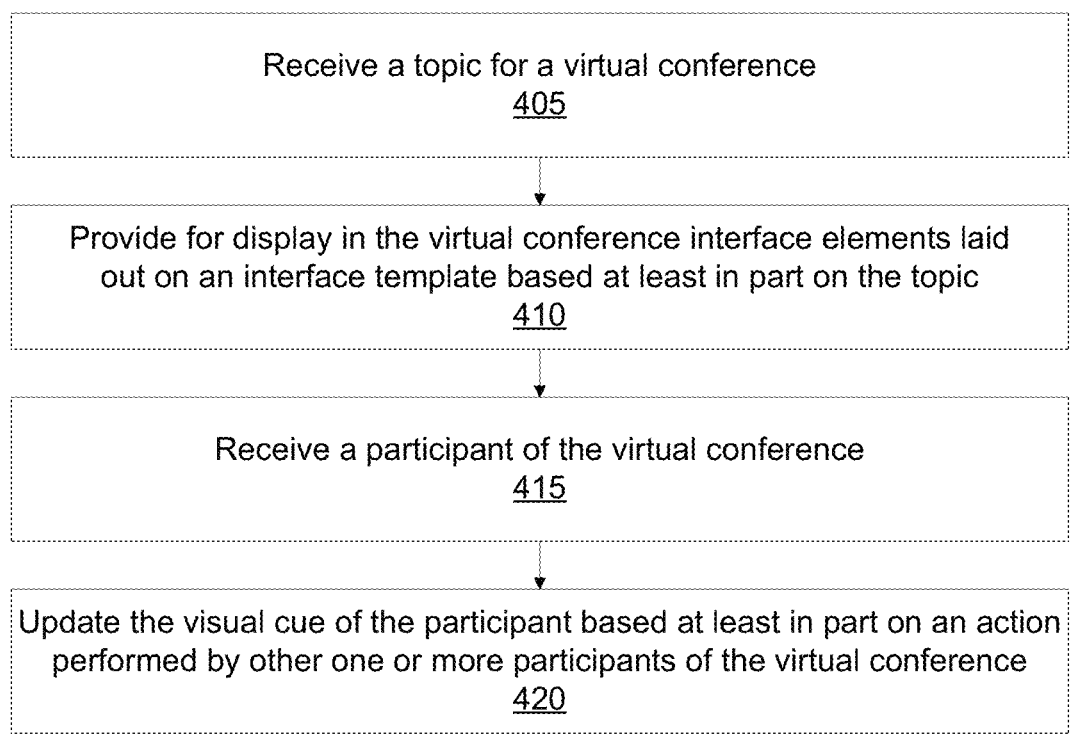
FIG. 4 illustrates a method of one embodiment for moderating communication among the participants via client devices by the conferencing system in the virtual conference environment.

FIG. 4 is an example of a flow chart of a method of one embodiment for moderating communication among the participants via client devices 210 by the conferencing system 230 in the virtual conference environment. The method can be performed by various components of the conferencing system 230 such as the situation evaluator 330, the visual cue generator 335 and the interface generator 340. In other embodiments, the functionality described in the method can be performed by additional and/or different components.

The conferencing system 230 receives 405 a topic and determines 410 one or more elements for display on one or more interface templates based at least in part on the selected topic. In one embodiment, one or more elements are selected from the interface elements store 310 and the one or more interface templates are selected from the interface template store 320. The conferencing system 230 associates each participant with their respective participant profile and a visual cue. In one embodiment, the participant profiles are selected from the participant store 315 and the visual cues are selected from the visual cue store 325. The conferencing system 230 updates 415 the visual cue of each participant based on actions from the participants. The step of updating 415 the visual cue of each participant is described in further detail with FIG. 7. The conferencing system 230 provides 420 an interface for display using the determined interface template and elements.

Figure 5:
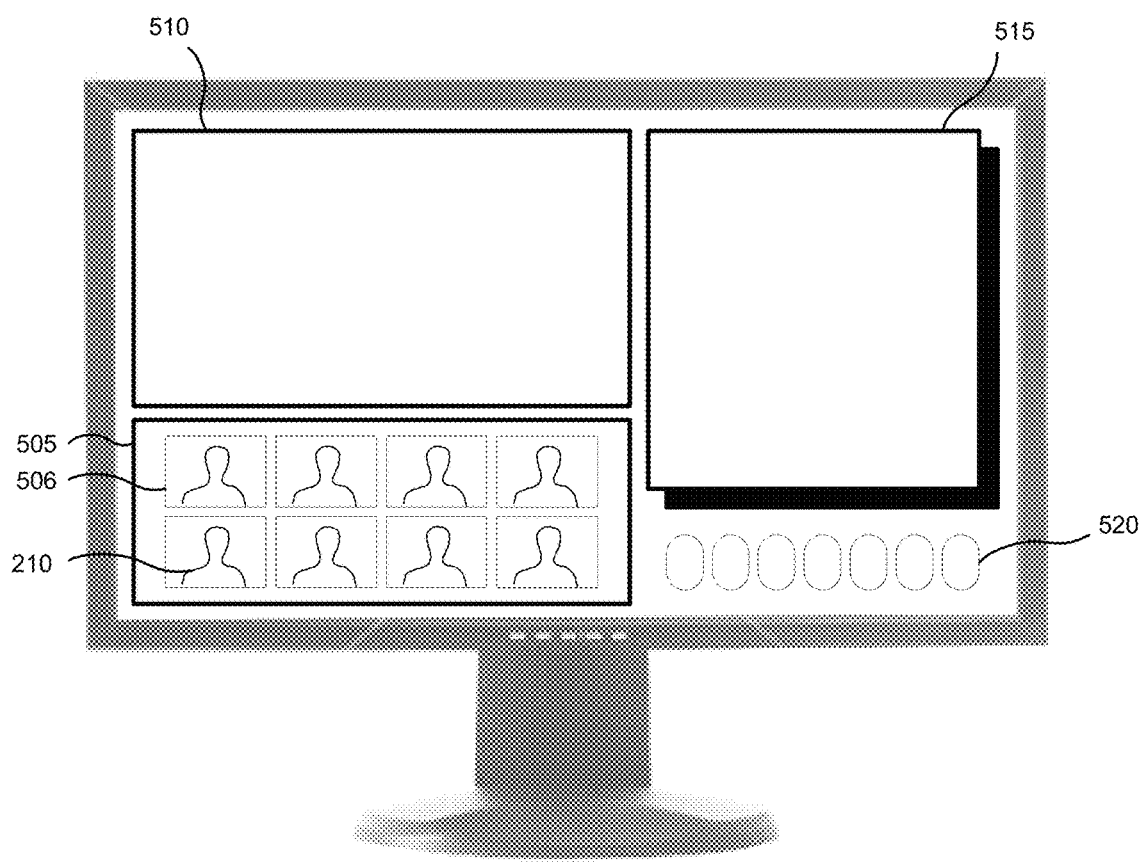
FIG. 5 illustrates one embodiment of an interface as seen by attendees via client devices in the virtual conference.

Referring now to FIG. 5, illustrated is an example of one embodiment of the user interface provided for display on client devices 210 associated with attendees in the virtual conference. The interface includes a participant element 505, a material element 510, a discussion element 515, and participation options 520. The participant element 505 includes one or more digital representations with visual cues 506 of the attendees. The interface was generated using an interface template. In other embodiments, the interface can be generated using a different template, thus restructuring the location and/or size of the elements on the interface.

Figure 6A:
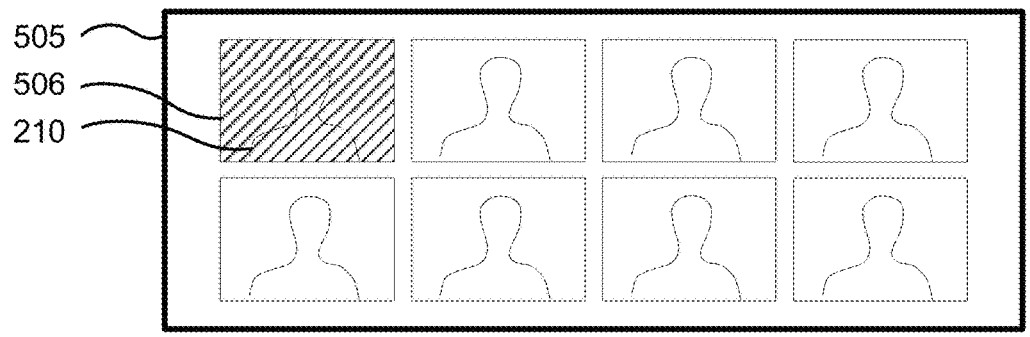
FIG. 6A-6C illustrate different views of a participant element as seen in the embodiment in FIG. 5.
Figure 6B:
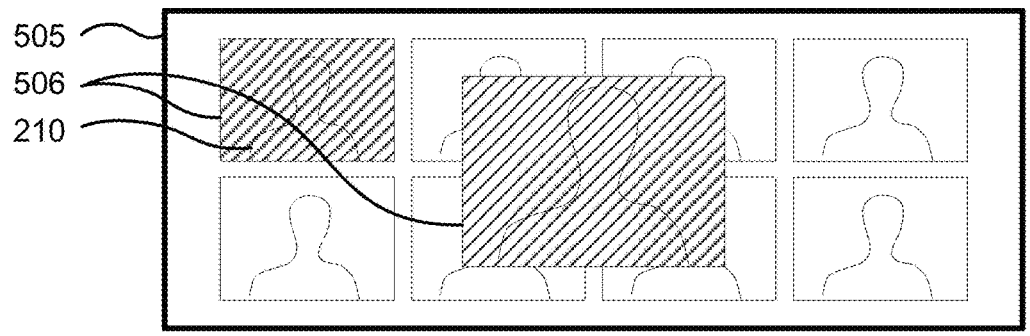
Figure 6C:
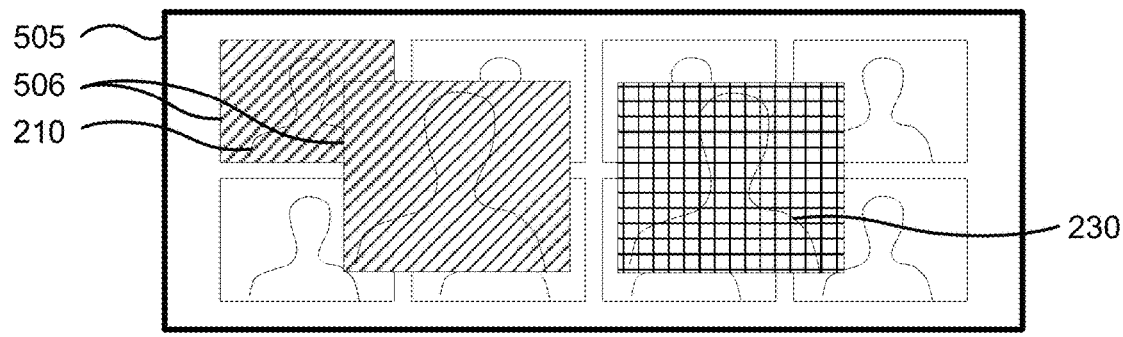

Referring now to FIGS. 6A, 6B, and 6C, illustrated are different views of the participant element 505 as seen in the embodiment in FIG. 5. FIG. 6A and FIG. 6B illustrate two example ways of indicating that one participant using a client device 210 is receiving one or more actions from one or more other participants using one or more other client devices 210. FIG. 6C presents a method of indicating a participant using a client device 210 in conversation with a leader. For example, a leader would ask a question and, in response, attendees would select one or more attendees to answer the question via their client devices 210. This example describes the situation where multiple attendees as well as the leader indicate who they are "looking at" by selecting (e.g., clicking or using a pointing device on tapping on a touch sensitive display) on another digital representation (e.g., icon) and the aggregate actions (e.g., clicks or taps) would display on the digital representation of the attendee receiving the aggregate actions on each participant's interface. The action taken, e.g., clicking or tapping, would be processed by the visual cue generator 335 and translated into a corresponding visual cue selected from the visual cue association store 325. For example, the click action or tap action prompts a change in intensity in the right and bottom borders of the digital representation of the attendee selected to answer the question.

FIG. 6A presents a visual cue 506 in the form of an image filter. For example, the image filter can be a grayscale transformation, tonal transformations, color balancing, histogram equalization, smoothing transformations, sampling transformations, color sampling, and any other suitable image manipulation transformations. The participant receiving one or more actions has an altered visual background as displayed within the user interface. FIG. 6B presents a visual cue 506 in the form of a larger digital representation on the user interface of a client device 210 and the image filter. FIG. 6C presents the visual cue 506 in the form of the larger digital representation for the participant and the leader in conversation. The participant has the image filter visual cue 506 and the leader has a different image filter visual cue 506. In alternative embodiments, the participant and leader are connected by arrows or other user interface icons connecting the participant and the leader on the user interface. The leader also may be identified by other visual characteristics displayed within the user interface, e.g., bright red border on the top and side border of the digital representation. It is noted that other characteristics also can be incorporated. For example, audio characteristics with the visual characteristics—such as a beep when the leader speaks and/or a different sound or tone when another participant is speaking.

Figure 7:
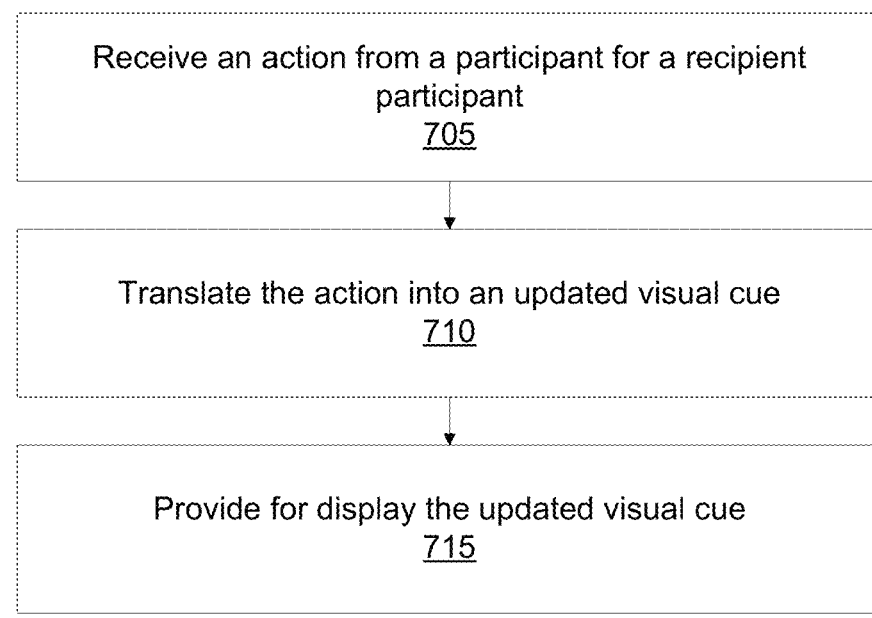
FIG. 7 illustrates a method of one embodiment of updating a visual cue based on actions from the participants.

FIG. 7 is a method of one embodiment of updating the visual cue of one or more participants based on actions from the participants. The conferencing system 230 receives 705 an action from a client device 210 associated with a participant for a second client device 210 associated with a recipient participant. The action taken by the participant includes an input via an input interface. For example, the input interface can be a point device cursor, touch sensitive gesture, or iris detection subsystem to click on, mouseover, make eye contact, or otherwise an interaction with the user interface (e.g., interaction "physically" with a pointing device or touch sensitive mechanism or visually through iris detection) to indicate a visual-like interaction with another participant. The action is directed towards the recipient participant by taking the action on the digital representation of the recipient participant. For the click, mouseover, and physical interaction, the recipient participant is determined by mapping the action one-to-one onto the interface. The same mapping is used to determine the recipient participant of the eye contact but the eye contact action also tracks eye movement using eye-tracking cameras, retina scanners, or other suitable image processing algorithms. In other embodiments, additional features of the participant are used to determine the recipient participant of the eye contact action including a measurement of a head tilt angle of the participant.

The conferencing system 230 translates 710 the action into an updated or generated visual cue by finding the associated visual cue for the action, e.g., in a database lookup table. For example, the action of looking at someone is associated with the visual cue of presenting an eye icon on the digital representation of the participant in the interface as seen by the recipient participant. In addition, the digital representation of the recipient participant on the interface of the other participants of the virtual conference has a right and bottom border increasing in intensity as more participants direct their action towards the recipient participant.

In some embodiments, the generated visual cue is an altered digital representation associated with the participant. For example, the digital representation may include a higher-resolution video stream, a larger video canvas, a zoomed-in view of a video, a zoomed-in view of a video that uses face-tracking to re-center and zoom in to include only the user's face, and any combination thereof. The digital representation of the recipient participant can be altered, for example, on a user interface of a client device 210 associated with the participant (e.g., first participant).

The conferencing system 230 provides 715 the updated visual cue for display on the interface of the client device 210, the second client device 210, or both the client device 210 and the second client device 210. In one embodiment, the updated visual cue is provided 715 for display on interfaces of each participant in the virtual conference moderated by the conferencing system 210, whether or not the participant was a participant in the action. In another embodiment, the updated visual cue is provided 715 for display only on interfaces of participants either sending or receiving the action. In this embodiment, participants not sending or receiving the action do not see any updated visual cue on their interface.

Additional Configuration Considerations

The disclosed embodiments provide a number of advantages and benefits. For example the disclosed embodiments include the ability to create a virtual environment that still maintains physical signals of a physical environment. More particularly, the disclosed configuration allows physical signals, such as body language, unintentional gestures, facial expressions, and eye signals, to be translated over to the virtual environment through actions available to participants in the virtual environment. The advantages of the disclosed configuration are in visual cues represented on interfaces of the participants to portray the actions. The visual cues provide the same result of physical signals despite being represented in the virtual environment. For example, if a teacher continues to maintain eye contact with a particular student after posing a question to the class, that student will usually feel compelled to respond. The same effect occurs in the virtual environment of the disclosed configuration through use of the virtual attention cues.

The foregoing description of the embodiments of the disclosed embodiments has been presented for the purpose of illustration; it is not intended to be exhaustive or to limit the disclosed configuration to the precise forms disclosed. Persons skilled in the relevant art can appreciate that many modifications and variations are possible in light of the above disclosure.

Some portions of this description describe the embodiments of the disclosed configuration in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium (e.g., storage medium) containing computer program code, which can be executed by a computer processor for performing any or all of the steps, operations, or processes described. This computer program product can be executed on a computer system, e.g., 100.

Embodiments of the disclosed configuration may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosed configuration may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the described subject matter. It is therefore intended that the scope of the disclosed configuration be limited not by this detailed description, but rather by any claims that issue on an application based hereon. Accordingly, the disclosure of the embodiments of the disclosed configuration is intended to be illustrative, but not limiting, of the scope of the disclosed configuration, which is set forth in the following claims.

What is claimed is:

1. A method for emulating physical visual attention interactions in a video conferencing environment with a plurality of participants, the method comprising:
   receiving, by the visual cue generator circuitry, an indication of an action through a user interface of a computing system associated with a first participant of the plurality of participants;
   translating, by the visual cue generator circuitry, the action into a visual cue associated with a recipient participant of the plurality of participants, the visual cue comprising an image filter for color, brightness, opacity, saturation, contrast, intensity, or hue to be applied over a digital representation of the recipient participant within the user interface; and
   providing, by the interface generator circuitry, the visual cue associated with the recipient participant for display on the user interface of the first participant and the recipient participant, wherein the image filter applied over the digital representation of the recipient participant increases in intensity as more participants from the plurality of participants perform a same action through the user interface on their respective computing systems.

2. The method of claim 1, wherein action includes a cursor click or mouseover.

3. The method of claim 1, wherein action includes an eye contact action, the eye contact action translated using image processing techniques comprising eye movement tracking algorithms.

4. The method of claim 3, wherein the eye movement tracking image processing technique comprises tracking eye movement relative to a location of a camera and a plurality of locations of a plurality of cameras on the user interface.

5. The method of claim 1, wherein the action comprises an interaction with a touch screen, the interaction with the touch screen translated using one-to-one mapping of a touch on the user interface, wherein the user interface is responsive to display on a touch sensitive screen.

6. The method of claim 1, wherein the plurality of participants of the video conferencing environment includes a leader and one or more attendees, wherein a digital representation of the leader is different than the digital representations of the one or more attendees.

7. The method of claim 1, wherein the user interfaces of other participants in the plurality of participants displays the visual cue.

8. A method for constructing a video conferencing environment, the method comprising:
   receiving a topic for the video conferencing environment by situation evaluator circuitry of a computing system, wherein the topic describes at least in part one or more subjects to be discussed in the video conference;
   providing for display in a user interface of the video conferencing environment, through interface generator circuitry the computer system, user interface elements laid out using an interface template based at least in part on the topic;
   receiving, through a visual cue generator circuitry of the computing system, an action from a first participant of a plurality of participants of the video conferencing environment; and
   altering, through the visual cue generator circuitry of the computing system, a visual cue of a recipient participant based at least in part on the action performed by the first participant of the plurality of participants of the video conferencing environment, the visual cue comprising an image filter for color, brightness, opacity, saturation, intensity, or hue to be applied over a digital representation of the recipient participant within the user interface, wherein the image filter applied over the digital representation of the recipient participant increases in intensity as more participants of the plurality of participants of the video conferencing environment perform the action, wherein the visual cue is altered on the user interface of the first participant and the recipient participant.

9. The method of 8, wherein the topic describes relationships between participants in the video conferencing environment.

10. The method of claim 8, wherein the action includes a cursor click or mouseover.

11. The method of claim 9, wherein the action comprises an eye contact action, the eye contact action translated using image processing techniques comprising eye movement tracking algorithms.

12. The method of claim 11, wherein the eye movement tracking image processing technique comprises tracking eye movement relative to a location of a camera and a plurality of locations of a plurality of cameras on a user interface.

13. The method of claim 8, wherein the action comprises a touch action, the touch action translated using one-to-one mapping of a touch on a user interface, wherein the user interface is responsive to display on a touch sensitive screen.

14. The method of claim 8, wherein the plurality of participants of the virtual conferencing system includes a leader and one or more attendees, wherein a digital representation of the leader is different than digital representations of the other one or more attendees.

15. The method of claim 8, wherein the user interfaces of other participants in the plurality of participants display the visual cue.

* * * * *